United States Patent [19]
Krämer

[11] Patent Number: 5,914,872
[45] Date of Patent: Jun. 22, 1999

[54] CONVERTER-FED DRIVE SYSTEM

[75] Inventor: Wilhelm Krämer, Sandhausen, Germany

[73] Assignee: ABB Daimler Benz Transportation (Technology) GmbH, Berlin, Germany

[21] Appl. No.: 09/093,569

[22] Filed: Jun. 8, 1998

[30] Foreign Application Priority Data

Jun. 6, 1997 [DE] Germany ............... 197 23 781

[51] Int. Cl.⁶ ..................................... H02M 1/00
[52] U.S. Cl. .......................... 363/141; 310/52; 257/712
[58] Field of Search ................... 363/141; 310/52, 310/53, 58, 59, 64, 65; 257/712

[56] References Cited

U.S. PATENT DOCUMENTS 3,573,569  4/1971  Davis et al. ............... 363/141 X
5,519,269  5/1996  Lindberg .................... 310/58

*Primary Examiner*—Peter S. Wong
*Assistant Examiner*—Y. J. Han
*Attorney, Agent, or Firm*—Herbert L. Lerner; Laurence A. Greenberg

[57] ABSTRACT

The invention is a converter-fed drive system having at least one drive motor fed by a converter unit. The converter unit has a valve assembly containing semiconductor valves, a cooler for cooling the semiconductor valves and a capacitor assembly are mounted directly on the drive motor. There is also an inductor assembly, that is electrically connected to the converter unit, but is installed such that it is spatially separated from the converter unit and the drive motor. The cooler is simultaneously used to cool the drive motor as well as the converter unit.

7 Claims, 2 Drawing Sheets

5,914,872

CONVERTER-FED DRIVE SYSTEM

BACKGROUND OF THE INVENTION

Field of the Invention

The invention relates to a converter-fed drive system which has at least one drive motor fed by a converter unit. The invention can be used in conjunction with street cars, trams and similarly powered vehicles.

ABB Technik 4/1994, pp. 26 to 32, discloses a converter-fed drive system for street cars used in inter-city railways in which driven running gear with individual-wheel drive is used. The drive system uses traction motors supplied with power provided by transistor inverters installed on the roof of the vehicles. This requires relatively costly cabling between the power supply and the drive motors.

SUMMARY OF THE INVENTION

It is accordingly an object of the invention to provide a converter-fed drive system which overcomes the hereinafore-mentioned disadvantages of the heretofore-known products and methods of this general type, and which provides a reduction in cost and in weight.

With the foregoing and other objects in view there is provided, in accordance with the invention, a converter-fed drive system, including a drive unit formed of at least one drive motor; and a converter unit having a valve assembly with semiconductor devices, a cooler with a coolant circuit for cooling the semiconductor valves and a capacitor assembly mounted directly on and feeding the at least one drive motor, the cooler simultaneously cooling the at least one drive motor and the converter unit; and an inductor assembly electrically connected to the drive unit but disposed spatially separate from the drive unit.

In accordance with an added feature of the invention, a pressure contact is formed between the at least one drive motor and the cooler to dissipate heat energy produced in the at least one drive motor.

In accordance with an additional feature of the invention, the at least one drive motor has a cooling system with coolant connectors for dissipating heat energy produced in the at least one drive motor, the cooling system is connected directly to the cooler of the converter unit by the coolant connectors.

In accordance with another feature of the invention, there is a driver circuit for driving the semiconductor valves, and the driver circuit is integrated in the capacitor assembly or the valve assembly.

In accordance with yet another added feature of the invention, there is an input circuit having an electrical connection, a fuse and a switching element, and the input circuit is integrated in the inductor assembly.

In accordance with yet another additional feature of the invention, the inductor assembly has a dedicated cooler with a coolant circuit integrated in the coolant circuit of the cooler of the converter unit for cooling the semiconductor valves.

In accordance with a concomitant feature of the invention, the at least one drive motor is one of a plurality of drive motors and the converter unit is one of a plurality of converter units, and there is also a central drive control and regulating unit electrically connected to the converter units.

The particular advantages that can be achieved by the invention are that the assemblies and the equipment are condensed to approximately ⅓ of the previous weights and volumes by virtue of the converter-fed drive system proposed, thereby resulting in weight, volume and cost reductions. For example, there is a reduction in the outlay regarding cabling and cooling of the structural components. One and the same cooling system serves to cool the semiconductor valves and the drive motors. The invention can be used both in the case of individual drives (for example in the case of wheel hub motors) and in the case of bogie drives. However, the fields of application are not restricted to vehicle technology, such as rail traffic vehicles, buses, lorries, for example, but rather relate to drive technology in its entirety, for example including industrial drives.

Other features which are considered as characteristic for the invention are set forth in the appended claims.

Although the invention is illustrated and described herein as embodied in a converter-fed drive system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
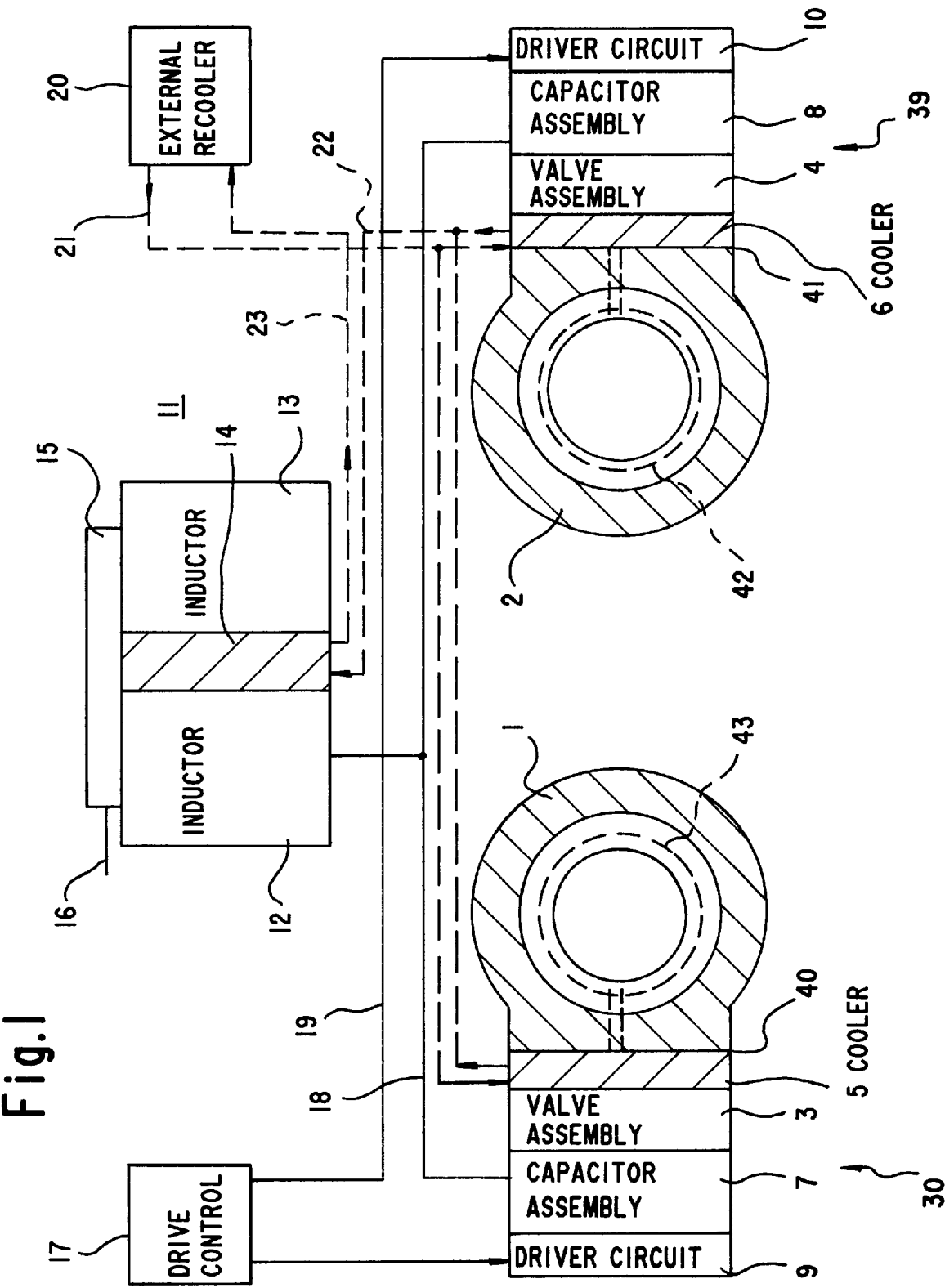
FIG. 1 is a block diagram of a converter-fed drive system with two drive motors according to the invention.

Referring now to the figures of the drawing in detail and first, particularly, to FIG. 1 thereof, there is shown a converter-fed drive system with two drive motors (individual-wheel drives). The configuration is essentially characterized by the fact that each of the drive motors 1 and 2 is directly connected to its own converter unit 30, 39; for example, the converter unit 30, 39 is mounted in the motor terminal box. Each converter unit includes a valve assembly 3 and 4, respectively, containing semiconductor valves, a cooler 5 and 6, respectively, and a capacitor assembly 7 and 8, respectively (in particular filter capacitors). Driver circuits 9 and 10, respectively, for a power supply of the semiconductor valves are integrated in the capacitor assemblies 7, 8 or the valve assemblies 3, 4.

The converter units 30, 39 including the components 3, 5, 7, 9 and 4, 6, 8, 10, respectively, are, expediently, hermetically encapsulated by a housing. The electrical connections are effected by sealed plug contacts. In this way, it is ensured that the converter units 30, 39 are protected against moisture and dust.

The coolers 5, 6 are integral parts of the valve assemblies 3, 4 and serve primarily to cool the semiconductor valves. At the same time, however, they additionally enable cooling of the drive motors 1, 2, without any substantially greater extra outlay. In order to reliably ensure dissipation of heat from the drive motors, according to a first embodiment, a thermal pressure contact 40, 41 between the drive motors 1, 2 and coolers 5, 6 is provided. That is to say that each structural component valve assembly/cooler is provided with a fastening flange which enables screwing together with the casing of the drive motor via screw bolts and disc springs. The disc springs setting the pressure required for the pressure contact.

According to a second embodiment, the drive motors 1, 2 themselves have cooling systems 42, 43 integrated in the cylinder casing of the stator, for example. Using coolant connectors, the coolant is directed from the cooler 5, 6 to the cooling system 42, 43 of the drive motor 1, 2. It is expedient for the recooled coolant first of all to pass completely through the cooler 5, 6 of the valve assembly and only then pass to the cooler 42, 43 of the drive motor 1, 2 in order to protect the temperature-sensitive semiconductors. The second variant is particularly suitable when a liquid coolant is used.

The capacitor assemblies 7, 8 or valve assemblies 3, 4 expediently have integrated measurement transducers which are of importance for the control and regulation of the drive system (for example measurement transducers for detecting current and voltage).

In order to keep the weight of the unsprung drive components to a minimum when the converter-fed drive system is used, the relatively weight-intensive inductive structural components are not mechanically connected directly to the drive motor 1, 2, but rather are mounted spatially separately from this on a sprung structural component of the vehicle.

A common inductor assembly 11 (in particular with filter inductors) for both converters is preferably provided. The inductor assembly 11 has either a single central inductor or—as illustrated in the exemplary embodiment—two separate inductors 12, 13, which make contact with a cooler 14. The inductor assembly 11 is electrically linked to the converter units 30, 39 in the necessary way via electrical connections 18.

It is particularly expedient if an input circuit 15 with an electrical connection, a fuse and a switching element including a drive is integrated in the inductor assembly 11. This particularly advantageous refinement obviates a separate terminal board that is otherwise customary, since the electrical power feeding 16 can take place directly at the input circuit 15.

A central drive control and regulating unit 17, which is connected to the converter units 30, 39 via electrical connections 19, is provided for superordinate control of the converter units 30, 39. Via these electrical connections 19, the drive control and regulating unit 17 receives measurement signals from the measurement transducers and supplies the driver circuits 9, 10 with the control signals required for setting the instantaneously desired driving power and the driving torque.

The cooling of the structural components (coolers 5, 6, 14) can be configured either as air cooling or as liquid cooling. In the exemplary embodiment, liquid cooling—preferably service-water cooling—is sketched, including the coolers 5, 6, 14, an external recooler 20 (including pump) and the associated hydraulic connecting lines (shown as dashed lines) between the components. A coolant forward flow 21 extends from the recooler 20 to the coolers 5, 6, and a coolant return flow 22 extends from these coolers 5, 6 to the further cooler 14, and a further coolant return flow 23 extends from the cooler 14 to the recooler 20. The coolant routing ensures that the heat-sensitive semiconductor valves of the converter units are preferably exposed to the relatively cold, recooled cooling liquid.

Figure 2:
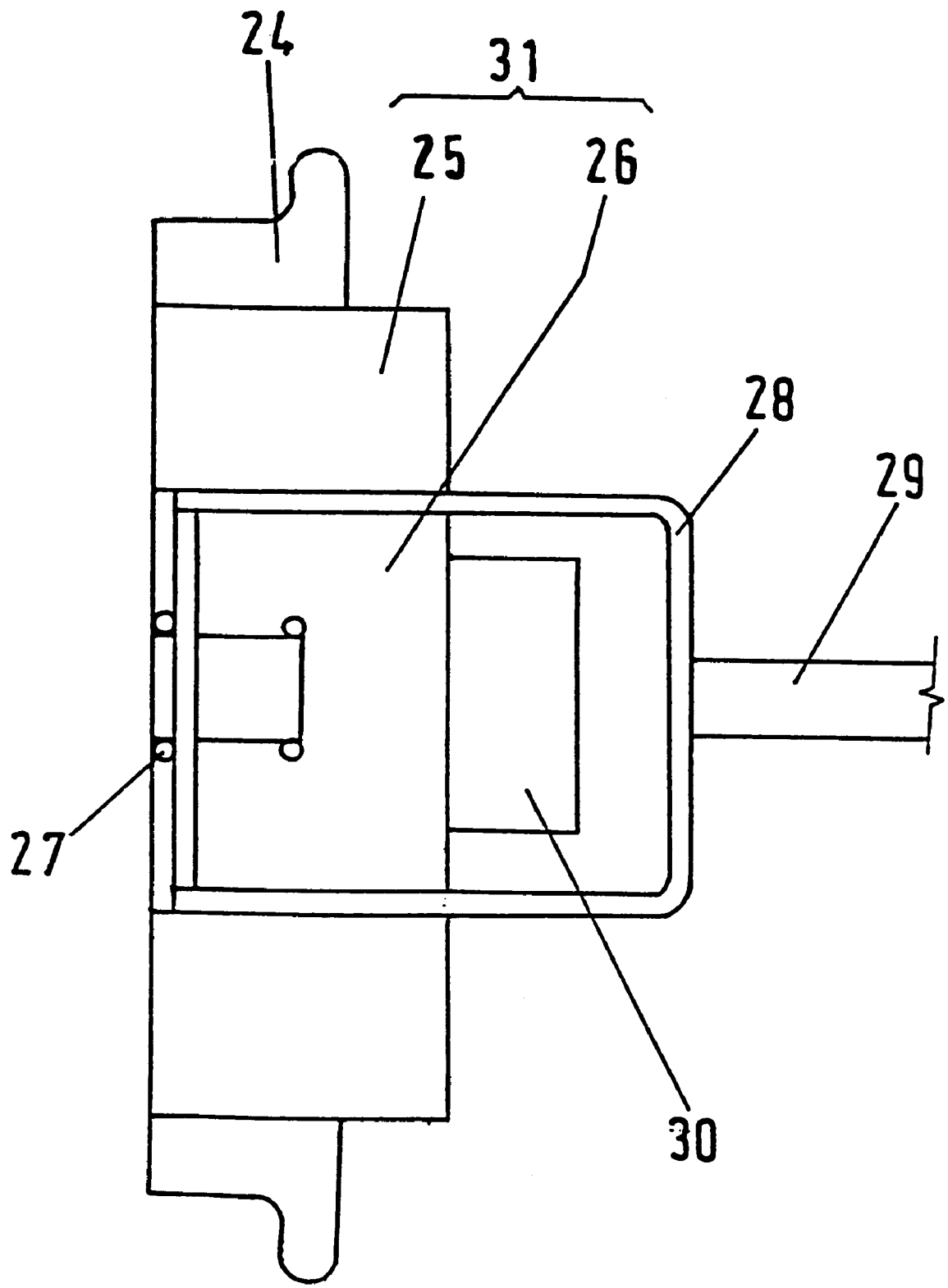
FIG. 2 is a diagram of the converter-fed individual wheel drive system and wheel hub motor.

A drive system with individual wheel drive and wheel hub motor is illustrated as a further exemplary embodiment in FIG. 2. The drive motor 31 (wheel hub motor) includes an outer rotor 25 and an inner stator 26. These two motor components 25, 26 being rotatably connected to one another via a bearing 27. The rotor 25 is fixedly connected to a wheel 24, while the stator 26 is fixedly mounted on a rim dish 28. The rim dish 28 in turn is rigidly connected to a fixed axle 29 mounted on the vehicle.

A converter unit 30, includes the following structural components: valve assembly 3 with semiconductor devices, cooler 5 for cooling the semiconductor devices, capacitor assembly 7 and driver circuit 9 (see FIG. 1), is arranged within the rim dish 28 and connected directly to the stator 26. The cooler 4 serving to cool the semiconductor valves is simultaneously used to cool the drive motor as well (by a pressure contact or coolant connectors).

The inductor assembly 11 and the drive control and regulating unit 17 are situated outside the drive unit, as described in the exemplary embodiment according to FIG. 1. The power supply (input circuit with electrical power feeding) and the control (drive control and regulating unit 17) are likewise effected according to the advantageous manner explained with reference to FIG. 1.

I claim:

1. A converter-fed drive system, comprising:
    a drive unit, including:
        at least one drive motor;
        a converter unit having a valve assembly with semiconductor valves, a cooler with a coolant circuit for cooling said semiconductor valves and a capacitor assembly mounted directly on and feeding said at least one drive motor, said cooler simultaneously cooling said at least one drive motor and said converter unit; and
    an inductor assembly electrically connected to said drive unit but disposed spatially separate from said drive unit.

2. The drive system according to claim 1, wherein a pressure contact is formed between said at least one drive motor and said cooler to dissipate heat energy produced in said at least one drive motor.

3. The drive system according to claim 1, wherein said at least one drive motor has a cooling system with coolant connectors for dissipating heat energy produced in said at least one drive motor, said cooling system being connected directly to said cooler of said converter unit by said coolant connectors.

4. The drive system according to claim 1, including a driver circuit for driving said semiconductor valves, said driver circuit being integrated in one of said capacitor assembly and said valve assembly.

5. The drive system according to claim 1, including an input circuit having an electrical connection, a fuse and a switching element, said input circuit being integrated in said inductor assembly.

6. The drive system according to claim 1, wherein said inductor assembly has a dedicated cooler with a coolant circuit integrated in said coolant circuit of said cooler of said converter unit for cooling said semiconductor valves.

7. The drive system according claim 1, wherein said at least one drive motor is one of a plurality of drive motors and said converter unit is one of a plurality of converter units, and including a central drive control and regulating unit electrically connected to said converter units.

* * * * *